United States Patent [19]

Hornfeld et al.

[11] 4,385,354
[45] May 24, 1983

[54] AUTOMATICALLY LANDING AN AIRCRAFT

[75] Inventors: Willi Hornfeld, Weyhe; Helmut Grobecker, Stuhr, both of Fed. Rep. of Germany

[73] Assignee: Vereinigte Flugtechnische Werke GmbH, Bremen, Fed. Rep. of Germany

[21] Appl. No.: 202,586

[22] Filed: Oct. 31, 1980

[30] Foreign Application Priority Data

Nov. 2, 1979 [DE] Fed. Rep. of Germany ....... 2944337

[51] Int. Cl.³ .............................................. G06F 15/50
[52] U.S. Cl. .................................... 364/429; 244/183; 340/26; 343/5 LS
[58] Field of Search ................... 364/428, 429; 340/26; 343/5 LS, 5 GC, 107, 108 R; 244/183, 184, 185

[56] References Cited

U.S. PATENT DOCUMENTS

| | | | |
|---|---|---|---|
| 3,417,945 | 12/1968 | Reynolds et al. | 244/184 |
| 3,610,930 | 10/1971 | Lacy et al. | 244/183 X |
| 3,671,963 | 6/1972 | Assouline et al. | 343/5 LS X |
| 3,697,022 | 10/1972 | Autechaud et al. | 364/429 X |
| 3,716,855 | 2/1973 | Asam | 343/5 LS |
| 4,196,346 | 4/1980 | McElhannon | 340/26 X |

FOREIGN PATENT DOCUMENTS 1552249 9/1979 United Kingdom .

Primary Examiner—Jerry Smith
Attorney, Agent, or Firm—Ralf H. Siegemund

[57] ABSTRACT

The aircraft is provided with an infrared sensor which is adjustable by means of feedback control so that its line of sight (image center) is and remains in line with the middle one of three infrared fires at and near the end of the runway. The craft is now maneuvered in such a way that its longitudinal axis is aligned with the horizontal component of the line of sight. After a particular distance has been reached, the aircraft descends while the image of the middle fire remains centered. The system uses existing equipment and is further supplemented to correct an initial gross deviation from the desired approach path.

7 Claims, 3 Drawing Figures

AUTOMATICALLY LANDING AN AIRCRAFT

BACKGROUND OF THE INVENTION

The present invention relates to automatically landing an aircraft, possibly even an unmanned aircraft, which is equipped with appropriate navigational controls.

Automated instrument landing is known generally and has been developed into practical use. The requisite instrumentation is quite extensive and expensive and must bear a reasonable relation to the benefit gained therewith. Of course, commercial aircraft, military transport planes, and similar type crafts, will always justify the expense. The situation is different, however, for small, unmanned aircraft, such as small reconnaissance planes, also known as remotely piloted vehicles, or RPV, for short. Instrument landing in the conventional sense cannot be realized here in a cost-effective manner, so that these planes are usually brought down by means of parachutes, nets, or the like.

DESCRIPTION OF THE INVENTION

It is an object of the present invention to provide for automated landing of an unmanned, remotely piloted aircraft.

German printed Patent Application 25 19 241 (see also British Pat. No. 552,249) discloses reconnaissance equipment for acquiring image information by an aircraft, covering territory crossed by the plane. This equipment includes an infrared TV-type camera and a programmable image selector for purposes of emphasizing certain points of interest (targets) and for deemphasizing background information. Its purpose is to limit the transmission of information to ground, to that portion that is absolutely necessary.

It is an object and feature of the present invention to make use of such an infrared image acquisition device on an unmanned aircraft during automated landing thereof.

In accordance with the preferred embodiment of the present invention, it is suggested to arrange a plurality of, e.g., three infrared lights or fires in a line which extends transversely to the runway, at one end thereof, whereby a middle one of the fires is on the center line of the runway. The aircraft is provided with a position-adjustable infrared sensor and image-generating device which is controlled as to its position and orientation so that, e.g., its center will be directed toward the middle fire. Angular deviations in the horizontal plane of the camera axis (line of sight) from the aircraft's longitudinal axis and direction of flight are measured and used to maneuver the aircraft toward that middle fire. The inventive method and system is, thus, comprised of a double-feedback loop. The first loop involves just the infrared sensor and the fires on ground, the loop operates to center the camera on one, e.g., the middle fire, and to continue to track the image thereof. The second loop involves the aircraft as a whole and the infrared sensor by way of follow-up, whereby the aircraft is caused to align with the optical axis of the camera as positioned by the first loop. Of course, any wind from the side, causing to shift the plane laterally, is taken into consideration. The alignment of the sensor axis is, thus, with the direction of flight, i.e., with the longitudinal axis of the aircraft plus a correction for wind.

Prior to this on-line operation, the camera should be oriented into a search position, such as forward and down at a particular (pitch) angle, at least when the aircraft is at a particular distance (e.g., 3 kilometer) from the airfield. The camera-centering and tracking operation will then proceed once the three fires appear in the image field and have been clearly identified. Previously, the fires may have been turned on when the aircraft was about 4 km from the field. The camera signal processing and acquiring stage should emphasize the images of the sources and deemphasize "background" to permit more positively the identification of the three fires. Following centering of the infrared sensor and following completion of maneuvering the aircraft into the approach path, the descent will begin and is tracked by the infrared camera as it seeks to center the image of the middle fire, while the actual flight path follows that centered line of sight of the sensor. In the case of a severe misalignment of the aircraft on approach, additional maneuvers may have to be instituted before the on-center-line tracking of the aircraft as a follow-up control of the centering of the camera can take place.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, FIG. 1 illustrates an unmanned aircraft, i.e. a remotely piloted vehicle, which approaches an airstrip or runway 2. The airfield is delineated in the drawing by dotted lines. The aircraft 1 is shown approaching the runway that instant at a particular value of its velocity V and is at a particular H above ground. Moreover, the aircraft has an actual distance S from the beginning of the runway.

Figure 1:
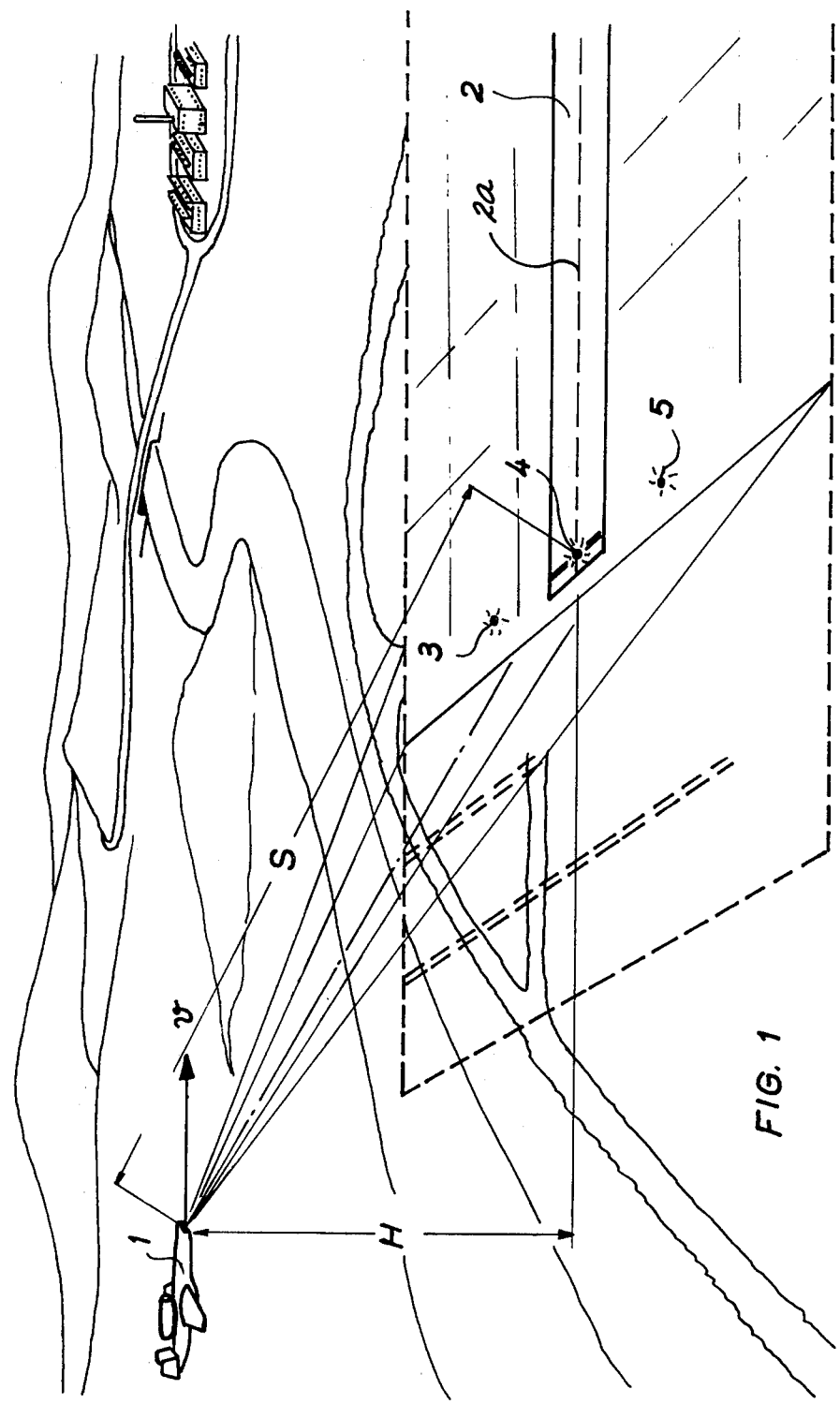
FIG. 1 is an overview of part of an airfield showing an approaching unmanned aircraft.

The runway 2 is, as far as the approaching aircraft 1 is concerned, identified by three infrared fires or lights 3, 4, and 5. The middle light or fire 4 is located at the end of the runway, on the center line 2a thereof. The two fires 3 and 5 are disposed on a line that extends transversely to the center line 2a and traverses the point of the location of light 4. Fires 3 and 5 are equidistantly spaced from fire 4, e.g. at a distance therefrom of 200 meters. The fires or the central one may oscillate for ease of recogniztion, but that it not essential in principle. It is, however, important that these fires constitute clearly identifiable, relatively strong sources of infrared radiation. The fires may not be on at all times, but are switched on when the aircraft has a particular distance from the airfield, say, 4 km or thereabouts. They may be switched on by ground control whenever that distance has been established and recognized.

Figure 2:
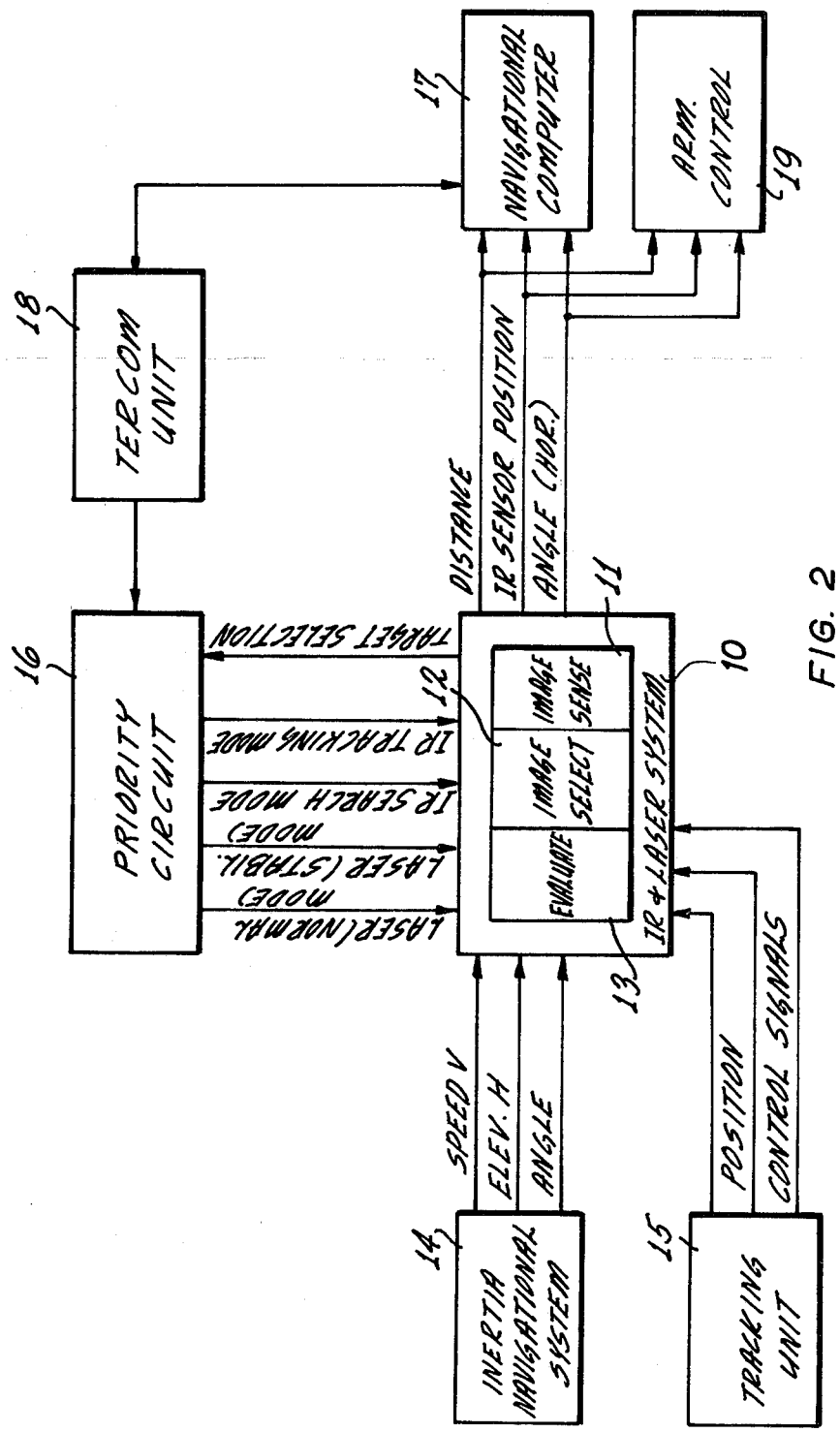
FIG. 2 illustrates schematically and as a block diagram an automatic landing system for practicing the best mode of the invention in accordance with the preferred embodiment thereof.

The block diagram shown in FIG. 2 depicts as a central element an infrared system 10, for example, of the type shown in the above-mentioned patent application No. P 25 19 241. This system includes an infrared image sensor 11 which is equivalent to an infrared TV-type camera. The line scan image signals from sensor 11 are fed to an image selection stage 12. The purpose of that stage as far as its normal use is concerned is not important at this point. As far as the present invention is concerned, it is a stage which, for example, processes the TV image signals to suppress information that is below a particular level, the latter being, for example, a particular db level below the average image level. This way, one will be able to clearly and unequivocally identify the fires whenever they appear in the image field. The response and discriminating level for suppressing and emphasizing certain image information may vary for different modes of operation of device 10. For the present purpose, this processing stage 12 will be primarily responsible to recognize the image of the fires on the landing strip, in contradistinction to other infrared reflectors from ground. This discriminating level may originally be based on the light intensity that can be expected when the fires first come into view. Later, the level may be raised to clearly single out the images of the three fires.

An evaluating unit 13 is connected to the select stage 12. Bearing in mind that the TV camera scan follows a well-defined scanning pattern, the location of each image point in the viewing field can be identified by an X-Y coordinate system, whose values are directly derivable from the scanning signals themselves which operate the sensor. The evaluating unit 13, thus, includes a stage, possibly a digital stage, which identifies and stores the coordinate values of the scan of the three fires when seen.

The unit 10 includes additionally a distance-measuring device, e.g., a laser unit. This laser unit may be independently oriented to point in forward and down direction. Conceivably, it may be operationally or physically coupled to the infrared sensor 11 to measure, e.g., the distance of the center of the sensor's image field from ground. This mode of operation may be restricted, however, to the landing mode and operation as described. At other times, the distance-measuring unit may be independently operating or only on specific command. Unit 10, finally, is suitably mounted and driven with respect to its orientation by suitable motors of unit 10, permitting the sensor to point in various directions. This control for the positioning of sensor 11 may include a suitable processor to generate the requisite position signals, either on the basis of external commands or by operation and response to specific coordinate values such as furnished by stage 13 in order to determine, for example, the deviation of the camera and image field center from a particular image in the image field. The position signals are used by a tracking unit 15 which generates the control signals for driving the positioning motors, etc., for sensor 11.

The system includes an inertia navigational measuring and sensing system 14 for the aircraft which includes the appropriate and conventional sensors and is, thus, capable of furnishing signals representing the forward speed V, the altitude H, and the angle of the aircraft in the horizontal plane, particularly during final approach. This angle is particularly the one between the longitudinal axis of the aircraft and its actual direction of flight. These signals are to be used by unit 10, to be described below.

The tracking unit 15 is provided to develop the requisite position control signals for initially position the camera or sensor 11 and for orienting it, as well as the distance-measuring device so that they are particularly oriented, e.g., on the basis of the position signals extracted from 10 and 13. In other words, the unit 15 prepares unit 10 to be ready for the acquisition of the fire image as well as for measuring the distance of the aircraft from these fires.

A priority control circuit 16 develops mode signals for the infrared unit 10. These mode signals are control signals for determining whether or not the laser-measuring device is to be in the stabilizing mode, i.e., is to follow the line of sight of the sensor 11; this will, indeed, be the case during the landing operation. At other times, the laser distance-measuring unit may be controlled to point in different directions and on the basis of other criteria which are not relevant here.

As far as the sensor 11 is concerned, unit 16 provides mode signals. One mode signal causes the sensor 11 to be oriented (via unit 15) into a search position. This mode signal is developed in response to a navigational position from a unit 18 (infra), e.g., when the aircraft is 4 km from the landing strip. Another mode signal follows the completed acquisition of the fires to operate the unit 10 (sensor 11) in a position-stabilizing, tracking mode in which unit 15 positions sensor 11 so that the image axis of the sensor remains in line with a particular target, e.g., the middle fire 4 on the runway.

As far as the search is concerned, it causes the evaluating circuits 12 and 13 to adapt specifically to the landing mode. This involves the adaptation of the discriminating level for recognizing clearly the fire images. The stabilizing and tracking mode involves the track control of unit 10 by unit 15 to center on one of these images and to keep the line of sight of the sensor on the middle fire. Thus, priority logic prepares unit 10 for all of these operations which differ from operations of unit 10 and its components carry out at other times.

The priority circuit 16 receives from unit 10 data identifying the actual target selection. This is not important here and is mentioned only for purposes of completion.

A navigational computer 17, which, ultimately, provides the flight control signals for the automated landing, operates inter alia on the basis of information furnished to it by unit 10. In addition, an areal navigation system 18 also called TERCOM (Terrain Countour Matching) unit, is provided. The navigational computer 17 receives, in particular, the data as acquired by unit 10. These data are, broadly speaking, the orientation of the line of sight of sensor 11 in the horizontal plane and in relation to the longitudinal axis of the aircraft and/or the actual direction of flight. The data include also the angle of the sensor in down direction. As will be described below, the sensor 11 is position-stabilized in that its center axis and line of sight point toward the middle fire. The unit 10 thus provides the computer 17 with an angle which is, in effect, an error signal indicating the deviation of the aircraft's current course from the target (middle fire) toward which it is supposed to fly. Additionally, the angle in forward and down direction will become steeper as the plane approaches the runway at constant altitude and is subsequently used as indicator for tracking the descent of the aircraft. Moreover, unit 10 furnishes the computer 17 with the distance value as acquired by the laser (distance S integral). The same data may be fed to an armament controller 19; but that is not important for the present invention and is relevant only when the system is not in the landing mode.

The navigational computer 17 cooperates with the TERCOM unit 18 which, during normal flight, controls its progress. These units are of the type which correlates statistically image data of the terrain underneath with terrain reference data and, thereby, controls the flight. This unit 18, therefore, is primarily responsible for maneuvering the aircraft back toward its home base airstrip. Unit 18 will be responsible primarily for determining when the aircraft is actually on approach so that the automatic landing operation can begin. This will not be an automatic switchover at an instant given by a particular location of the aircraft, but will depend upon when the infrared unit has found the infrared fires and the sensor 11 has completed its orientation toward them. The unit 18 may, however, determine when the search for the fires is supposed to begin. It will do so by causing the priority logic 16 to control units 10 & 15 to go into the search mode. Following the detection and position acquisition of the fire images, sensor 11 is oriented toward the middle fire; and after this feedback and stabilizing operation has been completed, control of the flight will be turned over to unit 10, to slave the horizontal course of the aircraft to the horizontal component of the line of sight.

Figure 3:
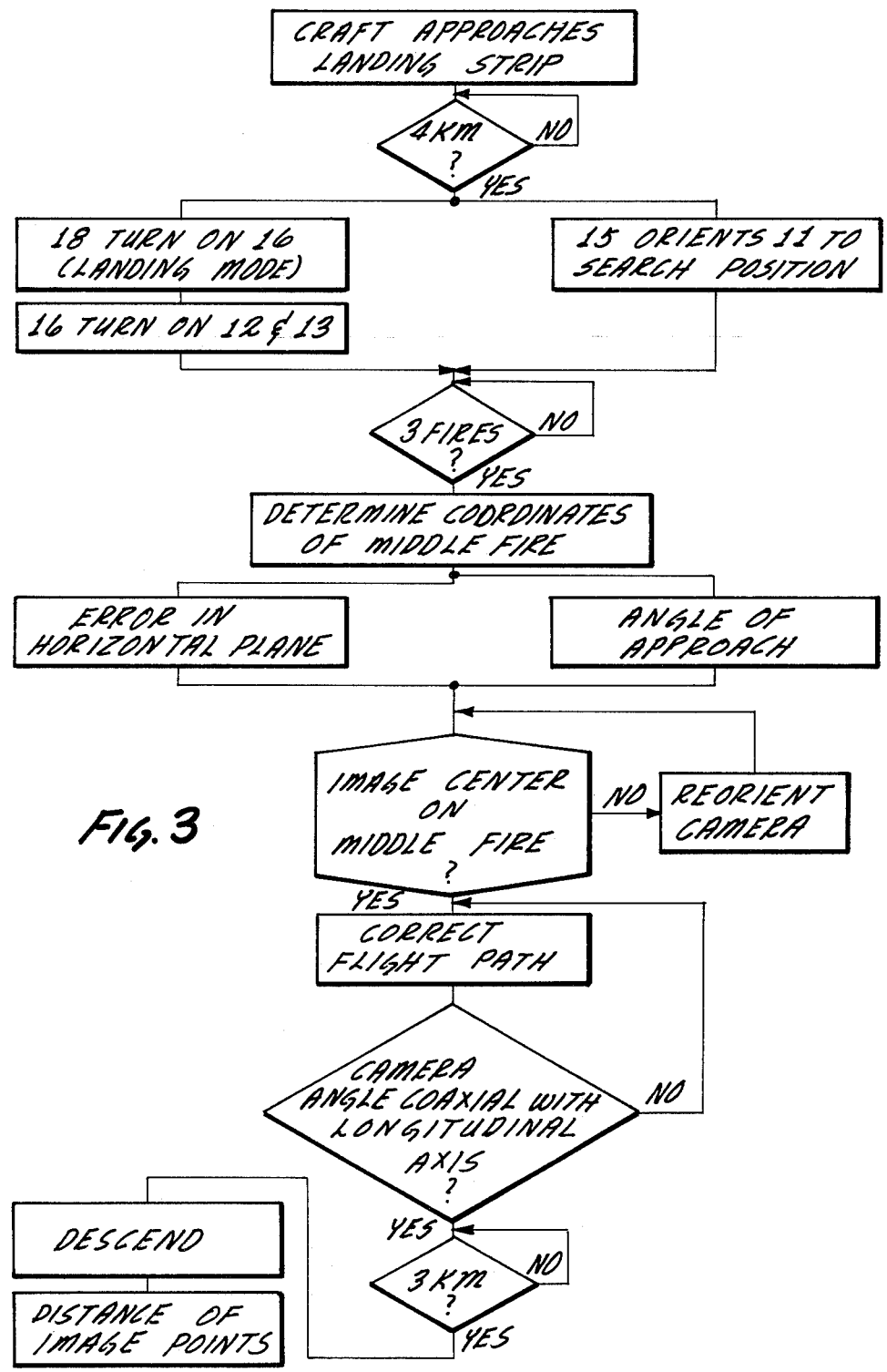
FIG. 3 is a flow chart for the operational sequence.

The system operates as follows (see FIG. 3). It is presumed that the vehicle 1 is on its return flight, under automatic control of TERCOM unit 18 or otherwise, but it is not presumed that the automated flight does, in fact, guide the vehicle 1 exactly toward and in line with the runway, but only generally toward the airfield. As soon as the aircraft has, approximately, a particular distance from the airfield (such as a few or several miles e.g. 4 km), units 15 and 16 receive a command from the on-board navigational unit 18 to change the mode of unit 10 to the landing mode and to place the sensor 11 into the search mode. In response thereto, unit 15 may at first issue control signals in order to reorient the infrared image sensor 11. This initial command will cause sensor 11 to point in forward direction, but at a particular angle in down direction. The command unit 15, moreover, terminates any previous target-seeking mode by unit 10, but, temporarily, sensor 11 assumes a fixed orientation. The down angle of sensor 11 may be such that, at the given altitude H, the aircraft has presently the distance S of the aircraft (sensor 11), to the point of intersection of the line of sight with ground has a value of, e.g., 3000 m. The aircraft, however, is still relatively far from the runway so that the middle fire 4 will not be right in the center of the field of view of sensor 11. Any of the fires may appear in the field of view somewhere near the margin.

At the particular distance from the airfield, e.g., 4 km, areal navigation system 18 causes also the logic 16 to change the mode unit to automated landing. This involves particularly a search by the stages 12 and 13 for the three fires; circuit 16, in other words, enables all those portions in unit 10 which permit later on the sensor 11 to position-stabilize so that its center line of sight will intercept the middle fire.

In particular, the image-select criteria may be changed in unit 12 to render the unit specifically responsive to the level of radiation from the fires 3, 4, and 5. As stated earlier, unit 12 operates with particular response levels in order to emphasize and deemphasize respectively higher and lower radiation values as received. The unit 16 will, at this time, cause unit 12 to select a discriminating level so that, at a particular distance (e.g., 4 km) from the airfield, the intensity of the fires when perceived are clearly above that level.

The timing of this change to the search mode is determined by the actual navigational conditions and depends upon the actual speed (ascertained by 14) and the actual location of the aircraft and its distance from the airfield, which is determined by unit 18. At about the same time, either by ground control or by a command from the aircraft (signalling therewith its arrival), the fires 3, 4, and 5 will be turned on. There may be a similar triplet at the other end of the runway so that the appropriate ones have to be selected.

The craft continues on its course still as controlled by the aerial navigation system 18 until the sensor 11 has all three fires in its image field. As stated, the coordinates of the images in the image field are ascertained by the evaluation stage 13. Following the initial particular orientation of the sensor 11, unit 10 searches for the three fire images; having found them, unit 11, as far as its orientation is concerned, is completely decoupled from the position and orientation of the aircraft. The decoupling may come about after the unit 13 has identified three image points, whereby, for example, a pretest by means of a small processor in unit 10 attempts to eliminate errors by testing, e.g, whether or not the three image points of the fires are on a straight line. Also, they must not have a larger distance from each than a 220-m distance could be seen from the present distance of the aircraft from the landing field. Following the recognition and acquisition of the three image points, unit 16 will cause unit 10 to enter the stabilizer mode for the infrared sensor 11.

The autonomous sensor position control is now operated by the stages 13 and 15 in that the coordinate values of the center fire 4 are used by unit 15 to reorient the sensor 11 until the image of fire 4 is exactly in the center. This, in turn, may result in a particular "misorientation" of the sensor 11 from the initial orientation. That is to say, the sensor 11 may point in a direction whose forward component in a horizontal plane deviates by a particular angle from the direction of actual flight. Also, the down angle of sensor 11 may differ and the image point distances of the outer fires (3, 5) from center fire 4 will have particular values. These values are fed to the computing facility 17 which now calculates the requisite control data for the aircraft. In fact, unit 10 takes over the continued control of the craft.

As far as the aircraft's navigation generally is concerned, this is and continues to be carried out by unit 18. Unit 18 was described as "TERCOM" navigational unit and as such it contains a subsystem which compares and correlates images, and a second navigational subsystem which, under utilization of the navigational computer, controls the aircraft (engine speed, rudder, elevators, and so forth). Normally, unit 17 calculates these flight control data on the basis of a match or mismatch of the image and reference data. Now, during the landing, the same navigational subsystem is used, except that there is no longer any image and reference image comparison, but the requisite flight control data are calculated by the computer on the basis of the misalignment of the infrared sensor 11 with the aircraft's longitudinal axis and its current course.

On the other hand, unit 10 tracks itself in that the sensor 11 is caused to remain centered on the image of fire 4, identifying the point toward which the plane is to head. The aircraft will be on approach when the sensor is oriented to point down and forward, and the position of the image of fire 4 does not change laterally. Also, the distance of the images of the outer fires 3 and 5 from the central one must be equal. It can thus be seen that, following a command to the aircraft's system, it will be prepared for landing, the sensor 11 is fixed into a particular search position. Having found three distinctive image points and having determined that they are on a straight line, a first, internal control loop in unit 10 causes the line of sight of sensor 11 to stabilize on the middle fire. Except in special cases to be discussed shortly, sensor 11 will remain stabilized in that fashion by this first control loop. Once this loop has stabilized, it slaves the aircraft to the line of sight of the sensor by a second loop in that the deviation of the horizontal component of that line of sight is reduced to zero by maneuvering the aircraft accordingly, this being a second loop.

Once the aircraft is in this operational state condition and has a particular distance from fire 4, a programmed descent is commanded (e.g., externally or internally on the basis of the established zero deviation state as described) and is carried out under utilization of the altitude data furnished by inertia system 14. The aircraft has at that point a particular height above ground and distance from the airfield. The descent will be controlled by means of the calculating facility in unit 17, particularly using the angle in the vertical plane along which the sensor 11 points in down direction, toward the middle fire 4. Thus, the control now operates by ensuring, through the descent of the aircraft, that the downwardly directed angle of the sensor 11 remains constant. The sensor 11, of course, maintains autonomously a centering position on the fire 4 and that may require a change in the up and down angle of orientation of the sensor. The aircraft's descent is controlled (via computer 17) so that that angle does not change.

The operation as described above assumes that the aircraft as it approached the airfield initially is approximately on course and that the corrective maneuvers, derived from infrared sensor misalignment as described, are minor in nature. The situation is different when the aircraft approaches the airfield at a rather oblique angle, e.g. 45°, or thereabouts. The acquisition and measuring system as described and as operating on the basis of the image data of the infrared landing lights and fires, still operates in the same manner; but in this case, more corrective maneuvers of the aircraft may not suffice, considering the rapidity of the approach. Therefore, the aircraft will undertake to make two particular turns in order to bring it more in line with the airstrip.

In the initial acquisition phase, with sensor 11 pointing straight forward and down, a line of three fires will appear somewhere in the margin portion of the image field of view. If this line, whose coordinate values are determined by unit 13, has an angle to the horizontal in excess of a particular value corresponding to an oblique approach of the aircraft, the unit will not at first, or will not continue to, stabilize toward the middle fire, but toward an outer one in order to cause the aircraft to make a turn. This first turn is carried out in that the aircraft is oriented to fly toward the outer fire which is farther from the central one than the third one is; this is the fire whose image is higher in relation to a horizontal line on the sensor image. The determination as to which one of the images is to be chosen as a temporary flight target is made by unit 10 itself. The distance meter or on-board calculations as to the relation of the image points to each other can be used to select this criterion.

This first turn reduces the asymmetry as between the images of the fire. As soon as that asymmetry drops below a limit (the limit being variable and depending upon the speed), a control command changes the flight condition, unit 17 will temporarily disregard the misalignment data from unit 10 and, instead, commands another turn. That turn is to follow a circle characterized by the fact that the extension of the center line 2a of the runway is a tangent line on that circle. This turn brings the aircraft in line with that tangent which is, indeed, the correct approach direction. Once on the tangent line, the fine position control through the sensor 11 and its orientation takes over again. Soon thereafter, the descent begins as described.

Another situation may occur in which the aircraft actually approaches the airfield at a right angle, or an angle close to a right angle. This case or situation is characterized by the fact that three fire images are vertically or near vertically aligned (within a particular, angular range about the vertical). Having found this deviation, the aircraft is first commanded to make a 90°, or near 90°, turn before the sensor control takes over. Another corrective turn may also be in order. The final approach is then carried out as described, including particularly the descent.

During the descent, generally, it may be advisable to use the continuously available distances between the images of the fire as an additional (or exclusive) criterion from which to calculate on a running basis the distance of the aircraft from ground. The final phase of descent is determined and initiated when the distance between the fires exceeds a particular value; they must be on a straight, horizontal line and equidistantly spaced. This then causes the aircraft to undergo the final landing maneuver.

The invention is not limited to the embodiments described above; but all changes and modifications thereof, not constituting departures from the spirit and scope of the invention, are intended to be included.

We claim:

1. Method of automatically landing an aircraft, comprising the steps of
providing a plurality of infrared fires at a particular distance from each other, one fire being centrally located at the end of a runway;
detecting, on board of the aircraft, images of the fires, under utilization of an infrared sensor;
reorienting the detecting sensor by means of automatic tracking so that an image of the centrally located fires has a central disposition with respect to and in an image frame;
automatically determining angular deviation of the reoriented sensor from the direction of flight of the aircraft in a horizontal plane; and
automatically maneuvering the aircraft on the basis of said determining step so that the aircraft approaches the said centrally located fire while maintaining the sensor oriented as having resulted from the reorienting step.

2. Method as in claim 1, the detecting step including, orienting the infrared sensor at a particular angle and in a particular direction; and searching for absence or presence of said images in its field of view.

3. Method as in claim 1 or 2, including the step of selecting a particular intensity level and/or a particular distance value in the images of the fires as a criterion for identifying them as images of said fires.

4. Method as in claim 1 and including the step of initiating descent after said aircraft has been maneuvered toward said centrally located fire.

5. Method as in claim 1, wherein said fires are turned on when the aircraft has a particular distance from them.

6. Apparatus for automatically landing an unmanned aircraft, comprising:
   an infrared image sensor, adjustably disposed in said aircraft;
   first loop means including the sensor for orienting the sensor and stabilizing its orientation to point toward a particular ground target point;
   second loop means being slaved to said first loop means for maneuvering the aircraft toward said target point; and
   means for causing said aircraft to descend toward said target point.

7. A system for automatically landing an unmanned aircraft, comprising:
   a plurality of infrared fires disposed on the ground in particular relation to a runway;
   an infrared sensor in the aircraft and being disposed for adjustable orientation;
   means connected to said sensor for being responsive to images of said fires and further connected to adjust said sensor so that its line of sight is particularly oriented to said fires, resulting in a possible angular deviation of a horizontal component of said line of sight to a longitudinal axis of the aircraft; and
   means for controlling the aircraft so that said angular deviation is reduced to zero, said means connected to the sensor maintaining said line of sight particularly oriented to said fires as the aircraft is controlled toward said zero deviation.

* * * * *